(12) United States Patent
Frey, Jr.

(10) Patent No.: US 9,207,328 B2
(45) Date of Patent: Dec. 8, 2015

(54) SYSTEM AND METHOD FOR DETERMINATION OF ATTITUDE FOR PROJECTILE

(75) Inventor: Robert D. Frey, Jr., Bolton, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 616 days.

(21) Appl. No.: 13/391,661

(22) PCT Filed: Jun. 21, 2011

(86) PCT No.: PCT/US2011/041144
§ 371 (c)(1),
(2), (4) Date: Feb. 22, 2012

(87) PCT Pub. No.: WO2012/024021
PCT Pub. Date: Feb. 23, 2012

(65) Prior Publication Data
US 2012/0154201 A1    Jun. 21, 2012

Related U.S. Application Data (60) Provisional application No. 61/357,381, filed on Jun. 22, 2010.

(51) Int. Cl.
*G01S 19/53* (2010.01)
*G01S 19/18* (2010.01)
(Continued)

(52) U.S. Cl.
CPC ............... *G01S 19/18* (2013.01); *F41G 7/346* (2013.01); *G01S 5/0247* (2013.01); *G01S 19/53* (2013.01)

(58) Field of Classification Search
CPC ......... G01S 19/53; G01S 19/18; F41G 7/346; F41G 7/2213; F41G 7/00; F42B 15/01
USPC .............. 342/357.36, 357.56, 355; 701/4, 72, 701/525; 244/3.15, 3.21
See application file for complete search history.

(56) References Cited

U.S. PATENT DOCUMENTS 5,406,489 A * 4/1995 Timothy et al. .................. 701/4
5,856,802 A * 1/1999 Ura et al. ................. 342/357.35
(Continued)

OTHER PUBLICATIONS

Li, Ho can a GPS receiver or MEMS (micro-electro-mechanical systems) inertial sensor assembly sense a host platform's orientation? How can these sensor technologies be combined together?, Jan./Feb. 2008, InsideGNSS.*

(Continued)

*Primary Examiner* — Gregory C Issing
(74) *Attorney, Agent, or Firm* — Daniel J. Long; Global IP Services; Prakash Nama (57) ABSTRACT

Disclosed is a system for determination of attitude for a projectile in flight. The system includes at least one antenna mounted on the projectile. Each antenna is configured to receive Global Positioning System (GPS) signals. Further, the system includes a signal receiving unit communicably coupled to the each antenna to receive the GPS signals and to ascertain the earth referenced velocity vector. The system also includes a plurality of magnetometers for ascertaining a projectile referenced earth's magnetic field vector. Moreover, the system includes a processing unit. The processing unit is configured to utilize a known projectile referenced velocity vector and a stored prediction of the earth referenced earth's magnetic field vector along with the measured earth referenced velocity vector and the measured projectile referenced earth's magnetic field vector to determine the attitude of the projectile. Further disclosed is a method for determination of attitude for a projectile in flight.

12 Claims, 4 Drawing Sheets

(51) Int. Cl.
*G01S 5/02* (2010.01)
*F41G 7/34* (2006.01)

(56) References Cited

U.S. PATENT DOCUMENTS

| | | | |
|---|---|---|---|
| 6,223,105 B1* | 4/2001 | Teague | 701/13 |
| 6,493,631 B1* | 12/2002 | Burns | 701/472 |
| 6,671,587 B2* | 12/2003 | Hrovat et al. | 701/1 |
| 6,760,664 B1* | 7/2004 | Julie et al. | 701/469 |
| 6,860,023 B2* | 3/2005 | Manfred et al. | 33/356 |
| 7,105,790 B2* | 9/2006 | Lamorlette | 244/3.2 |
| 7,341,221 B1* | 3/2008 | Wilson | 244/3.21 |
| 7,500,636 B2* | 3/2009 | Bredy | 244/3.15 |
| 2002/0008661 A1* | 1/2002 | McCall et al. | 342/357.14 |
| 2003/0149528 A1 | 8/2003 | Lin | |
| 2004/0188561 A1 | 9/2004 | Ratkovic et al. | |
| 2005/0040985 A1* | 2/2005 | Hudson et al. | 342/357.02 |
| 2008/0269963 A1* | 10/2008 | Vos et al. | 701/4 |
| 2009/0182503 A1 | 7/2009 | Changey et al. | |
| 2010/0117894 A1 | 5/2010 | Velde et al. | |

OTHER PUBLICATIONS

Gebre, MAV Attiude Determination by Vector Matching, Jul. 2008, IEEE Transactions on Aerospace and Electronic Systems vol. 44, No. 3.*
Hall, Chapter 4, Attitude Determination, Mar. 18, 2003.*
Markley, Attitude Determination Using Two Vector Measurements, 1999, NASA's Goddard Space Flight Center.*
Humphreys, Magnetometer-based Attitude and Rate Estimation for a Spacecraft with Wire Booms, Jul.-Aug. 2005, Journal of Guidance, Control and Dynamics.*
Changey et al, "Projectile Attitude and Position Determination Using Magnetometer Sensor Only," Intelligent Computing: Theory and Applications III, edited by Kevin L. Priddy, Proc. of SPIE, vol. 5803, 2005, pp. 1-10.*

* cited by examiner

SYSTEM AND METHOD FOR DETERMINATION OF ATTITUDE FOR PROJECTILE

FIELD OF THE DISCLOSURE

The present disclosure generally relates to determination of attitude for a projectile in flight. More particularly, the present disclosure relates to a system and a method for determination of attitude for a projectile in flight that is insensitive to roll rate, day/night operation and maneuvers.

BACKGROUND OF THE DISCLOSURE

Projectiles that are launched at a target are generally equipped with a guidance system to accurately intercept the target in required time. When equipped with a GPS receiver, a guidance system can use current projectile position as measured by the GPS along with known target location derive flight corrections required to intercept the target. The guidance system also requires knowledge of the attitude of the projectile in flight at each moment in order to accurately intercept the target in the required time. The term, 'attitude' of the projectile in flight as used herein above and below may refer to a roll attitude, a pitch attitude, and a yaw attitude of the projectile in flight. Further, the GPS guidance system based on the attitude of the projectile precisely determines corrections, such as acceleration corrections, required by the projectile in flight for accurately intercepting the target.

To implement the required corrections, the GPS guidance system of the projectile needs to have knowledge of the roll attitude of the projectile in flight. Additionally, the projectile while in flight using a proportional navigation (a guidance technique) requires corrections for gravity. For the corrections of gravity, knowledge of the roll attitude and the pitch attitude of the projectile is also required.

Various approaches for determining the roll attitude of the projectile involve sensing of a GPS signal by the GPS guidance system of the projectile while the projectile spins. Further, the sensed GPS signal may be combined with the known information about location of a satellite communicably coupled to the projectile for providing a low bandwidth measurement of the roll attitude of the projectile in flight. However, the low bandwidth measurement of the roll attitude of the projectile in flight is sensitive to a roll rate, and accordingly, determination of a down angle of the projectile may not be made as the roll rate approaches to zero value. Furthermore, the combined information of the sensed GPS signal and the known information about the location of the satellite may not be used to determine the pitch attitude and the yaw attitude of the projectile in flight.

Other approaches for determining the attitude of the projectile in flight include sensing the rate of change of the pitch attitude (for example, an angular rate) using a gyroscope. In this approach, an arctangent of the sensed rate in a projectile pitch axis and the projectile yaw axis provides a direct measurement of the roll attitude. However, such an approach is corrupted by any coning motion (gyroscopic precession) of the projectile and/or guidance corrections that impart pitch rate and yaw rate disturbances. Furthermore, the aforementioned approach is influenced by bias and noise in the direct measurement carried out by the gyroscope.

Accordingly, there is a need for an efficient and effective system and method for determination of attitude for a projectile in flight, in a manner wherein the determination of attitude for a projectile in flight is insensitive to roll rate, day/night operation and maneuvers.

SUMMARY OF THE DISCLOSURE

In view of the foregoing disadvantages inherent in the prior art, the general purpose of the present disclosure is to provide a system and a method for determination of attitude for a projectile in flight, to include all advantages of the prior art, and to overcome the drawbacks inherent in the prior art.

An object of the present disclosure is to efficiently and cost-effectively determine attitude for a projectile in flight that is insensitive to roll rate, day/night operation, coning, and maneuvers, such as guidance maneuvers.

Another object of the present disclosure is to provide a high bandwidth measurement of a roll attitude of the projectile in flight.

To achieve the above objects, in an aspect of the present disclosure, a system for determination of attitude for a projectile in flight is disclosed. The system includes at least one antenna mounted on the projectile. Each antenna of the at least one antenna is configured to receive Global Positioning System (GPS) signals from at least four satellites through wireless communication. Further, the system includes a signal receiving unit communicably coupled to the each antenna of the at least one antenna to receive the GPS signals from the each antenna. The signal receiving unit is further configured to ascertain the earth referenced velocity vector of the projectile by utilizing the GPS signals. Furthermore, the system includes a plurality of magnetometers mounted onto the projectile and configured to ascertain the projectile referenced earth's magnetic field vector. The system also includes a processing unit communicably coupled to the signal receiving unit to receive the earth referenced velocity vector of the projectile from the signal receiving unit. Further, the processing unit is communicably coupled to the plurality of magnetometers to measure the projectile referenced earth's magnet field vector from the plurality of magnetometers. The processing unit is further configured to utilize the known velocity vector of the projectile along the projectile's axis in the direction of flight and knowledge of the earth referenced earth's magnetic field vector derived from stored data dependent on GPS measured earth position of the projectile along with the measured earth referenced velocity vector of the projectile and the measured projectile referenced earth's magnetic field vector to determine the attitude of the projectile. One such method using the measurement of two vectors, magnetic vector and velocity vector, in each of the two coordinate systems, the earth referenced and the projectile reference is the TRIAD method.

In another aspect, the present disclosure provides a method for determination of attitude for a projectile in flight using a system that includes at least one antenna, a signal receiving unit, a plurality of magnetometers, and a processing unit. The method includes receiving Global Positioning System (GPS) signals by the at least one antenna of the system from at least four satellites through wireless communication. The method further includes receiving the GPS signals by the signal receiving unit of the system from the at least one antenna. Additionally, the method includes ascertaining an earth referenced velocity vector of the projectile by utilizing the received GPS signals by the signal receiving unit. The method also includes ascertaining the projectile referenced earth's magnetic field vector by the plurality of magnetometers of the system. The method also includes receiving the earth referenced velocity vector and the projectile referenced earth's magnetic field vector by the processing unit of the system from the signal receiving unit and the plurality of magnetometers. Furthermore, the method includes, utilizing the known projectile referenced velocity vector and the known earth referenced earth's magnetic field vector derived from stored data dependent on GPS measured earth position of the projectile along with the earth referenced velocity vector of the projectile and the projectile referenced earth's magnetic field vector by the processing unit to determine the attitude of the projectile using a TRIAD method.

These together with the other aspects of the present disclosure, along with the various features of novelty that characterize the present disclosure, are pointed out with particularity in the claims annexed hereto and form a part of the present disclosure. For a better understanding of the present disclosure, its operating advantages, and the specified objects attained by its uses, reference should be made to the accompanying drawings and descriptive matter in which there are illustrated exemplary embodiments of the present disclosure.

BRIEF DESCRIPTION OF THE DRAWINGS

The advantages and features of the present disclosure will become better understood with reference to the following detailed description and claims taken in conjunction with the accompanying drawings, in which:

DETAILED DESCRIPTION OF THE DISCLOSURE

The exemplary embodiments described herein in detail for illustrative purposes are subject to many variations in structure and design. It should be emphasized, however, that the present disclosure is not limited to a particular system and a particular method for determination of attitude for a projectile in flight, as shown and described. It is understood that various omissions and substitutions of equivalents are contemplated as circumstances may suggest or render expedient, but these are intended to cover the application or embodiments without departing from the spirit or scope of the claims of the present disclosure. Also, it is to be understood that the phraseology and terminology used herein are for the purpose of description and should not be regarded as limiting.

The use of "including," "comprising," or "having" and variations thereof herein is meant to encompass the items listed thereafter and equivalents thereof, as well as additional items. Further, the terms, "a" and "an" herein do not denote a limitation of quantity, but rather denote the presence of at least one of the referenced item. Unless limited otherwise, the terms "coupled," and variations thereof herein are used broadly and encompass direct and indirect couplings.

In one aspect, the present disclosure provides a system for determination of attitude for a projectile in flight. The system includes at least one antenna mounted on the projectile. Each antenna of the at least one antenna is configured to receive Global Positioning System (GPS) signals from at least four satellites through wireless communication. Further, the system includes a signal receiving unit communicably coupled to the each antenna of the at least one antenna to receive the GPS signals from the each antenna. The signal receiving unit is further configured to ascertain an earth referenced, velocity vector of the projectile by utilizing the GPS signals. Further, the system includes a plurality of magnetometers mounted onto the projectile and configured to ascertain the projectile referenced earth's magnetic field vector. The system also includes a processing unit communicably coupled to the signal receiving unit to receive the earth referenced velocity vector of the projectile from the signal receiving unit. Further, the processing unit is communicably coupled to the plurality of magnetometers to measure the projectile referenced earth's magnetic field vector from the plurality of magnetometers. The processing unit is further configured to utilize the known projectile referenced velocity vector along the axis of the projectile in the direction of flight and the earth referenced earth's magnetic field vector derived from stored data dependent on GPS measured earth position of the projectile along with the earth referenced velocity vector of the projectile and the projectile referenced earth's magnetic field vector to determine the attitude of the projectile using a TRIAD method. The system of the present disclosure is explained in detail in conjunction with FIGS. 1-3.

Figure 1:
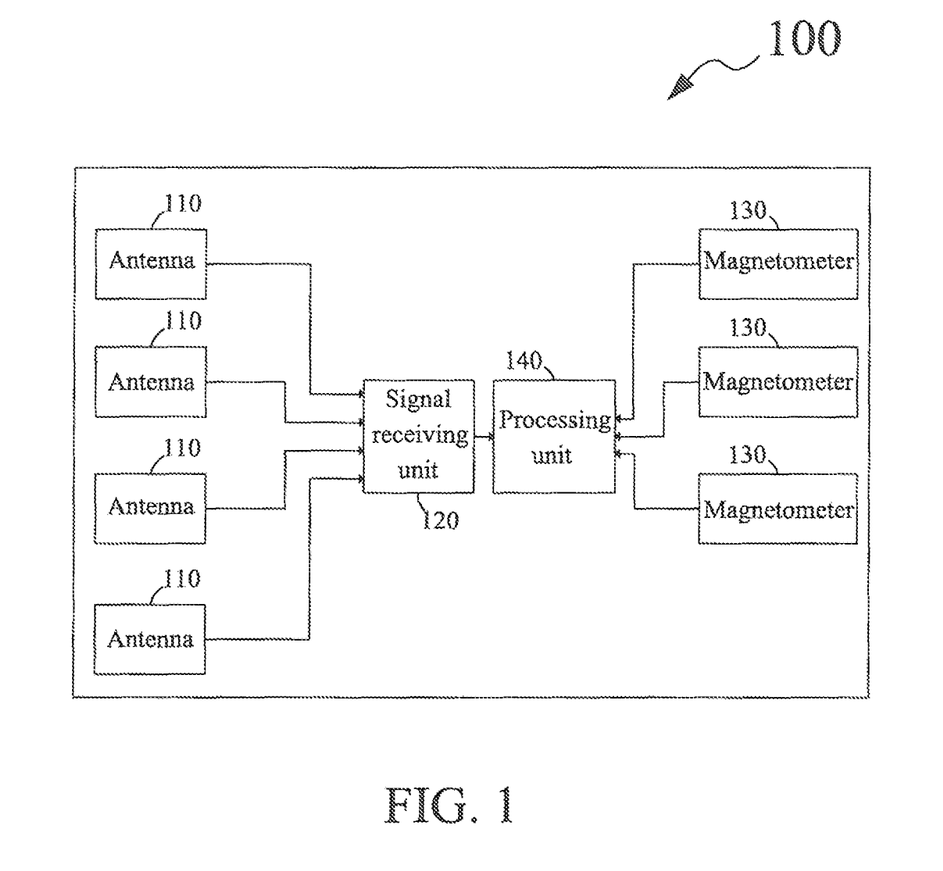
FIG. 1 illustrates a block diagram of a system for determination of attitude for a projectile in flight, in accordance with an embodiment of the present disclosure.

Referring to FIG. 1, a system 100 for determination of attitude for a projectile (not shown) in flight is provided. The projectile is a vehicle in which the system 100 may be implemented. Suitable examples of the projectile include, but are not limited to, a rocket, a mortar, a bomb and the like. The system 100 includes at least one antenna mounted on the projectile. More specifically, the system 100, according to the present embodiment, includes a plurality of antennas 110. The antennas 110 are mounted on a surface (not shown) of the projectile. Specifically, the antennas 110 may be mounted on an outer surface of the projectile. Further, the antennas 110 are configured to receive Global Positioning System (GPS) signals from at least four satellites (such as satellites of the GPS network) through wireless communication.

The antennas 110 are configured to receive the GPS signals in any arbitrary attitude of the projectile. It is to be understood that the number of antennas, such as the antennas 110, mounted on the surface of the projectile is not critical to the enablement of the present disclosure. For example, in the present embodiment, four antennas 110 are used for receiving the GPS signals through wireless communication. Typically, four antennas, such as the antennas 110, are used for spinning projectiles. However, additional antennas may be used for anti-jamming applications/implementations. Moreover, a single antenna may be used for slowly spinning projectiles, wherein a GPS guidance system initially searches for the GPS signal, and subsequently, orients to satellites. Furthermore, the antennas 110 may be antennas that are known in the art for receiving GPS signals from one or more satellites.

The system 100 also includes a signal receiving unit 120. The signal receiving unit 120 is communicably coupled to the each antenna of the antennas 110. Further, the signal receiving unit 120 receives the GPS signals from the each antenna. Specifically, GPS signals from the each antenna may be combined and provided to the signal receiving unit 120. It may be evident that the system 100 may include one or more components, such as, a signal combiner unit, and the like, to combine the GPS signals received by the each antenna and to provide the combined GPS signals to the signal receiving unit 120.

Figure 2:
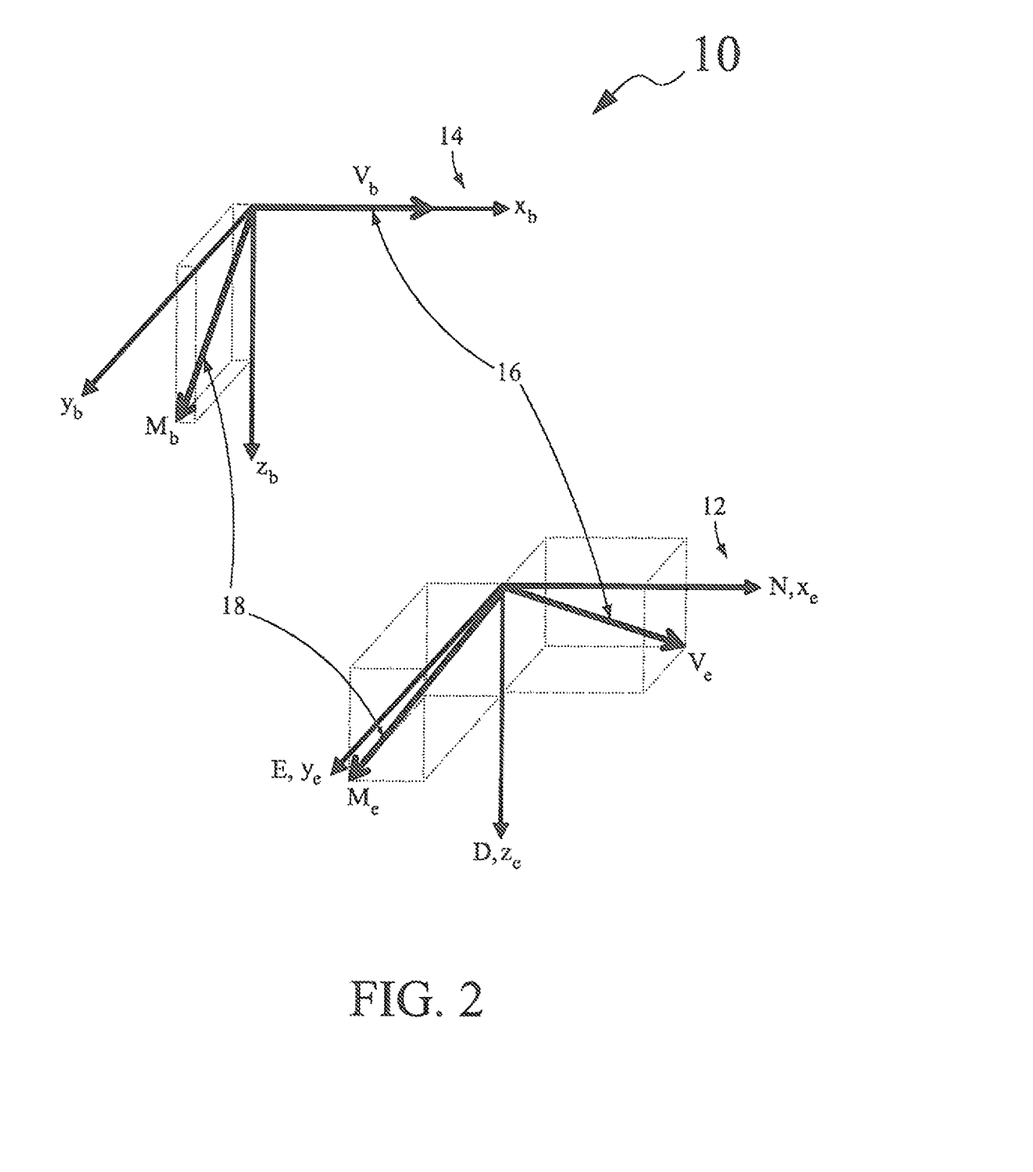
FIG. 2 illustrates a schematic diagram of vector relationships for determination of attitude for a projectile, using the system of FIG. 1.

Moreover, the signal receiving unit 120 is configured to ascertain the earth referenced velocity vector '$V_e$', as shown in FIG. 2, by utilizing the GPS signals. The signal receiving unit 120 typically ascertains the earth referenced velocity vector '$V_e$' of the projectile by observing a Doppler shift in the received GPS signals, and using latitude, longitude and altitude information of the projectile with respect to the observable satellites. Further, the signal receiving unit 120 is configured to ascertain the earth referenced velocity vector '$V_e$' of the projectile with respect to earth's co-ordinates, wherein the earth's co-ordinates are earth's North-East-Down co-ordinates. Specifically, the earth's co-ordinates are represented as co-ordinates 12 that include 'N, $x_e$' (North co-ordinate), 'E, $y_e$' (East co-ordinate) and 'D, $z_e$' (Down co-ordinate), as depicted in FIG. 2 that illustrates a schematic diagram 10 of vector relationships for determination of attitude for the projectile using the system 100. Thus, the earth referenced velocity vector '$V_e$' is an inertially referenced measurement. Typically, signal receiving unit's 120 velocity measurement noise is of the order of 10 centimeters/second (cm/sec) horizontal and 15 centimeters/second (cm/sec).

Further, the processing unit 140 ascertains the body referenced velocity vector '$V_b$' of the projectile in flight. As shown in FIG. 2, the projectile referenced velocity vector '$V_b$' of the projectile in flight is ascertained with respect to body co-ordinates of the projectile, i.e., vehicle co-ordinates. Further, the body co-ordinates of the projectile are represented as co-ordinates 14 that include '$x_b$' (towards x-axis), '$y_b$' (towards y-axis) and '$z_b$' (towards z-axis) co-ordinates, as depicted in FIG. 2. The body referenced velocity vector '$V_b$' is nominally directly along the projectile's x-axis ('$x_b$' co-ordinate), as depicted in FIG. 2. Alternatively, the projectile referenced velocity vector '$V_b$' may be assumed to be a unit vector of the projectile's velocity in the co-ordinates 14 and is approximated as [1, 0, 0] unless information of an angle of attack of the projectile is available, as in the present embodiment. The earth referenced velocity vector '$V_e$' and the projectile referenced velocity vector '$V_b$' of the projectile constitute speed 16 of the projectile, i.e., vehicle's speed.

It may be understood that the signal receiving unit 120 of the system 100 may be a unit known in the art for receiving the GPS signals from the each antenna of the antennas 110, with the functionality of ascertaining the earth referenced velocity vector '$V_e$' and/or the projectile referenced velocity vector '$V_b$' of the projectile. Moreover, the signal receiving unit 120 may be detachably attached within the projectile in flight.

Referring again to FIG. 1, the system 100 includes a plurality of magnetometers 130. Specifically, according to the present embodiment, the system 100 includes three magnetometers 130. Each magnetometer of the magnetometers 130 is mounted onto the projectile orthogonally with respect to an adjacent magnetometer of the magnetometers 130, thereby forming a triaxial measurement system. Such triaxial measurement system is typically available as a surface mountable system. Thus, the each magnetometer of the magnetometers 130 may be mounted on either an inner surface or an outer surface of the projectile.

Further, the magnetometers 130 are configured to ascertain a projectile referenced earth's magnetic field vector '$M_b$' as shown in FIG. 2. The projectile referenced earth's magnetic field vector '$M_b$' is ascertained by the magnetometers 130 with reference to the body co-ordinates, i.e., the co-ordinates 14 ($x_b$, $y_b$, $z_b$), of the projectile as explained earlier. Thus, the projectile referenced earth's magnetic field vector '$M_b$' is a body referenced measurement. Additionally, the each magnetometer of the magnetometers 130 is configured to have a high bandwidth for allowing a sampling rate greater than or equal to about 100 Hertz (Hz) on a roll attitude of the projectile. Accordingly, the system 100 employs application of rapid sample updates to the each magnetometer of the magnetometers 130, while using slower sample rates on velocity of the projectile in flight (as defined by ascertaining the earth referenced velocity vector '$V_e$' and/or the projectile referenced velocity vector '$V_b$'). It is to be understood that typical GPS receivers in the projectiles provide 10 Hz updates on velocity measurements of the projectile.

Moreover, the each magnetometer of the magnetometers 130 may be calibrated depending on the required accuracy for the system 100. Such calibration of the each magnetometer is utilized to compensate for locally generated magnetic fields on the projectile in flight and soft magnetic field effects. The soft magnetic field effects are generally caused by local distortions to a magnetic field generated, by any ferrous material on the projectile in flight that may be in the orientation of the magnetic field. Furthermore, there may be additional unpredicted local magnetic fields resulting from significant launch shock on any ferrous material on the projectile. However, certain methods are known in the art for determining a fixed magnetic field on the projectile in flight, based on observation of the magnetic field magnitude in presence of either inherent or induced projectile motion.

The earth referenced earth's magnetic field vector '$M_e$', as depicted in FIG. 2 is determined stored information. The earth referenced earth's magnetic field vector '$M_e$' is ascertained with reference to the earth's co-ordinates, i.e., the co-ordinates 12 (N, $x_e$; E, $y_e$; D, $z_e$) that have been explained earlier. The earth referenced earth's magnetic field vector '$M_e$' is a predicted magnetic field vector based on the information of latitude and longitude of the projectile. The magnetic field information as a function of latitude and longitude of the projectile may also be pre-loaded (i.e. before launching the projectile) within the system 100 of the projectile having a limited range. Alternatively, a table of predictions of latitude and longitude of the projectile may be carried/stored within the projectile, for determining the earth referenced earth's magnetic field vector '$M_e$' based on the predicted information of latitude and longitude of the projectile or the GPS measured location. The projectile referenced earth's magnetic field vector '$M_b$' and the earth referenced earth's magnetic field vector '$M_e$' of the projectile constitute earth's magnetic field vector 18 as depicted in FIG. 2.

The magnetometers 130 of the system 100 may be inexpensive magnetometers that are known in the art for determining magnetic fields.

Referring again to FIG. 1, the system 100 further includes a processing unit 140. The processing unit 140 is communicably coupled to the signal receiving unit 120 to receive the earth referenced velocity vector '$V_e$' of the projectile from the signal receiving unit 120. The processing unit 140 is further communicably coupled to the magnetometers 130 to measure the projectile referenced earth's magnetic field vector '$M_b$' from the magnetometers 130. The processing unit 140 is also configured to utilize the projectile referenced velocity vector '$V_b$' of the projectile and the earth referenced earth's magnetic field vector '$M_e$'. Specifically, the processing unit 140 may be either loaded with the earth referenced earth's magnetic field vector '$M_e$' or the processing unit 140 may ascertain the earth referenced earth's magnetic field vector '$M_e$' based on GPS reported earth location. The processing unit 140 may further assume the projectile referenced velocity vector '$V_b$' to be [1, 0, 0] in body co-ordinates, i.e., the co-ordinates 14, unless information on angle of attack of the projectile is available. Furthermore, the processing unit 140 is configured to utilize the velocity vector '$V_e$' of the projectile, the velocity vector '$V_b$' of the projectile, the earth's magnetic field vector '$M_b$' of the projectile and the earth's magnetic field vector '$M_e$' using an algorithm such as the TRIAD method for determining the attitude of the projectile. Thus, the processing unit 140 is a processing module that is adapted to utilize the aforementioned vectors and running requisite algorithm to perform the TRIAD method. The TRIAD method is known in the art, and accordingly, a description thereof is herein avoided for the sake of brevity.

In the present disclosure, the processing unit 140 uses the TRIAD method to compute a direction cosine matrix '$T_{be}$' based on the velocity vector '$V_e$', the velocity vector '$V_b$', the earth's magnetic field vector '$M_b$' and the earth's magnetic field vector '$M_e$' to determine the attitude of the projectile. The vectors '$V_e$', '$V_b$', '$M_b$', and '$M_e$', may be expressed as unit vectors, for example, the processing unit 140 assumes the velocity vector '$V_b$' to be approximated as [1, 0, 0] unless information about the angle of attack of the projectile is available to the processing unit 140. Further, the availability of information about the angle of attack of the projectile improves the accuracy of the estimation of the attitude of the projectile. Additionally, the angle of attack for inherently stable platforms may typically be kept below eight degrees. In general, the angle of attack is assumed to be zero degree for achieving the required accuracy. Thus, the system 100 may be implemented in projectiles that have a pre-determined angle of attack ranging from about 0 to about 8 degrees.

Moreover, the computed direction cosine matrix '$T_{be}$' relates the unit vectors in the body co-ordinates ('$V_b$', $M_b$') and the earth co-ordinates ('$V_e$', $M_e$') as:

$$V_b = (T_{be})(V_e) \text{ and,}$$

$$M_b = (T_{be})(M_e)$$

The direction cosine matrix '$T_{be}$' is a 3-by-3 matrix, and is calculated a transformation matrix as shown below:

$$T_{be} = [t_{1b} \, t_{2b} \, t_{3b}][t_{1e} \, t_{2e} \, t_{3e}]^T \text{ wherein,}$$

$$t_{1b} = M_b$$

$$t_{1e} = M_e$$

$$t_{2b} = M_b \times V_b$$

$$t_{2e} = M_e \times V_e$$

$$t_{3b} = t_{1b} \times t_{2b}$$

$$t_{3e} = t_{1e} \times t_{2e}.$$

The direction cosine matrix '$T_{be}$' is also used to relate a plurality of acceleration commands (correction accelerations) required by the projectile to accurately hit the target. Further, the plurality of acceleration commands is derived in the earth reference space based on a trajectory error of the projectile. The trajectory error may be determined by either the processing unit 140 or the signal receiving unit 120 after processing the received GPS signals with respect to the body co-ordinates of the projectile for applying the appropriate correction accelerations in the projectile path using a plurality of fins mounted on the projectile, a plurality of thrusters of the projectile and other means of imparting correction accelerations. The transformation, from earth referenced (in earth co-ordinates) correction accelerations ($a_e$) to body referenced (in body co-ordinates) correction accelerations ($a_b$) is shown in the following equation:

$$a_b = (T_{be})(a_c)$$

Further, the direction cosine matrix '$T_{be}$' may be used to extract Euler roll angle ($\Phi$), pitch angle ($\theta$) and yaw angle ($\psi$) using standard relationships available in the art. Following are the formulae utilized to calculate the aforementioned angles ($\Phi$, $\theta$, $\psi$). A notation used in the following formulae is $T_{be}$ (row, col). Further, the aforementioned angles ($\Phi$, $\theta$, $\psi$) are calculated by the following formulae:

$$\text{Roll angle } (\Phi) = \text{atan}\left(\frac{T_{be}(2,3)}{T_{be}(3,3)}\right)$$

$$\text{Pitch angle } (\theta) = \text{asin}(T_{be}(1,3))$$

$$\text{Yaw angle } (\psi) = \text{atan}\left(\frac{T_{be}(1,2)}{T_{be}(1,1)}\right)$$

As mentioned in the above formulae, the term, 'a tan' represents the arctangent and the term, 'a sin' represents the arcsine.

Referring again to FIG. 2, if the earth referenced velocity vector '$V_e$' is aligned to the earth referenced earth's magnetic field vector '$M_e$' and the projectile referenced velocity vector '$V_b$' is aligned to the projectile referenced earth's magnetic field vector '$M_b$', then it may not be possible for the processing unit 140 of the system 100 to determine the attitude of the projectile. The determination of the attitude of the projectile includes at least one of a roll attitude, a yaw attitude and a pitch attitude, as determined by the angles ($\Phi$, $\theta$, $\psi$). Further, the determination of the attitude of the projectile becomes sensitive to noise and measurement error as the projectile approaches in alignment with the earth referenced earth's magnetic field vector '$M_e$'. Further, the system 100 provides optimum performance when the earth referenced, velocity vector '$V_e$' is orthogonal to the earth referenced earth's magnetic field vector '$M_e$' and the projectile referenced velocity vector '$V_b$' is orthogonal to the projectile referenced earth's magnetic field vector '$M_b$'. For the projectile (including ballistic projectiles), it is unlikely that the system 100 dwells in alignment to earth's magnetic field. In fact, occurrence of such an alignment is easily detected by observing the measurement of the projectile referenced earth's magnetic field vector '$M_b$' in body co-ordinates of the projectile. Moreover, if extended dwell is expected, a plurality of gyroscopes may be required to bridge a period of the alignment.

Figure 3:
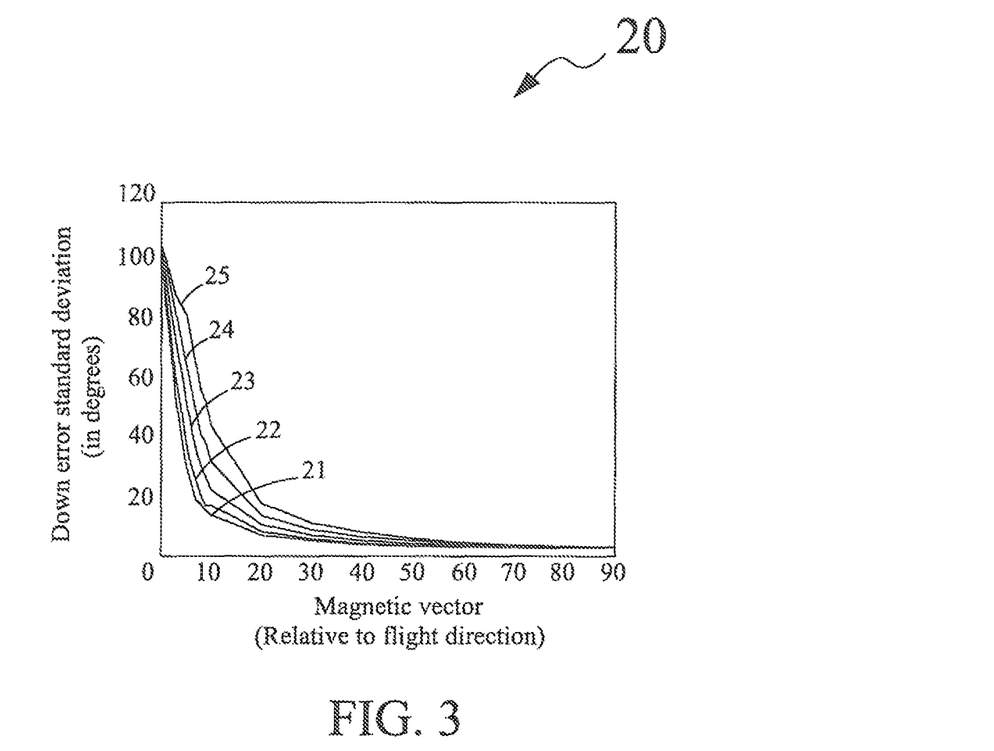
FIG. 3 illustrates a graph depicting results of a sensitivity analysis for various angles of attack of a projectile on estimated roll attitude using a conventional triaxial magnetometer for predicted accuracy, parametric with the angle of attack.

As mentioned above, the system 100 may be implemented in projectiles that have a pre-determined angle of attack ranging from about 0 degrees to about 8 degrees. FIG. 3 illustrates results of a sensitivity analysis for various angles of attack on estimated roll attitude using a conventional triaxial magnetometer, such as Honeywell HMC1043 triaxial magnetometer, aligned to within 2 degrees of the projectile axes, and a velocity random error of about 0.1 meters/second (m/s) based on the received GPS signals. More specifically, the results of the sensitivity analysis are illustrated in a graph 20 having a y-axis that illustrates down error standard deviation (in degrees) and an x-axis that illustrates a magnetic vector relative to the projectile's flight direction. The graph 20 depicts curves 21, 22, 23, 24 and 25, when the angle of attack of the projectile is 0, 2, 4, 6 and 8 degrees, respectively. As visible from FIG. 3, the down error standard deviation is maximum, when the angle, of attack is 8 degrees (as shown by the curve 25), whereas the down error standard deviation is least when the angle of attack is 0 degrees (as shown by the curve 21).

In use, the system 100 of the present disclosure is utilized for determination of the attitude for a projectile in flight. When the projectile is launched and is in flight, the antennas 110 mounted on the projectile receive the GPS signals from the at least four satellites through wireless communication. Thereafter, the signal receiving unit 120 of the system 100 receives the GPS signals from the antennas 110 and further ascertains the earth referenced velocity vector 'V$_e$'. Further, the magnetometers 130 of the system 100 ascertain the projectile referenced earth's magnetic field vector 'M$_b$'. Furthermore, the processing unit 140 of the system 100 receives the ascertained earth referenced velocity vector 'V$_e$' from the signal receiving unit 120 and the ascertained projectile referenced earth's magnetic field vector 'M$_b$' from the magnetometers 130.

Moreover, the processing unit 140 also utilizes the projectile referenced velocity vector 'V$_b$' and the earth referenced earth's magnetic field vector 'M$_e$' of the projectile along with the earth referenced velocity vector 'V$_e$' and the projectile referenced earth's magnetic field vector 'M$_b$', using the TRIAD method for determining the attitude of the projectile in flight.

Figure 4:
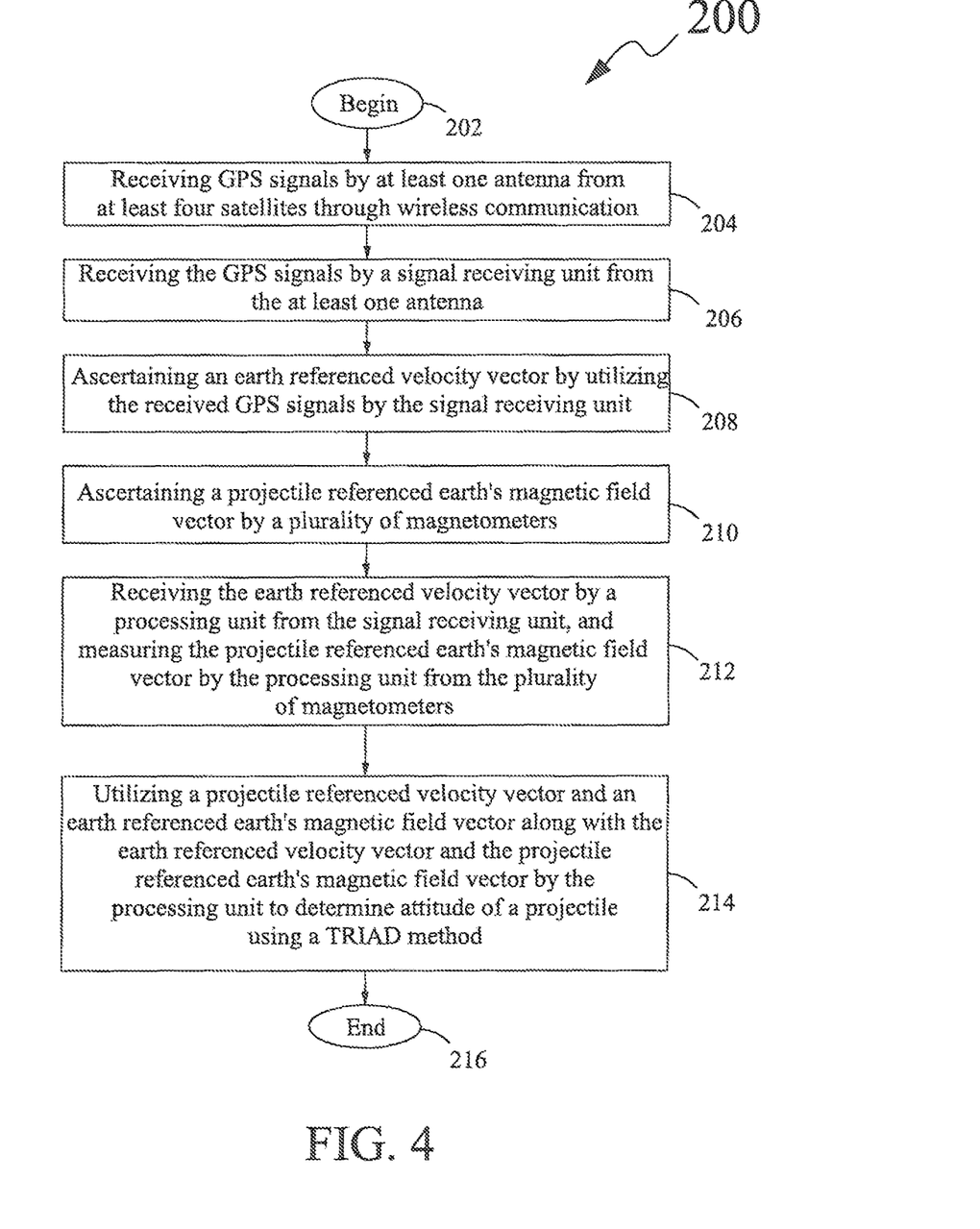
FIG. 4 illustrates a flow diagram for a method for determination of attitude for a projectile in flight, in accordance with an embodiment of the present disclosure.

In yet another aspect, the present disclosure provides a method 200 for determination of attitude for a projectile in flight, as depicted in FIG. 4. References will be made to the system 100 and components thereof, of FIG. 1, to explain the method 200 in conjunction with FIG. 4. The method 200 begins at 202. At 204, the GPS signals are received by the at least one antenna, such as the antennas 110, from the at least four satellites through wireless communication. At 206, the signal receiving unit 120 receives the GPS signals from the antennas 110. At 208, the signal receiving unit 120 ascertains the earth referenced velocity vector 'V$_e$' by utilizing the received GPS signals.

At 210, the magnetometers 130 ascertain the projectile referenced earth's magnetic field vector 'M$_b$'. At 212, the processing unit 140 receives the earth referenced velocity vector 'V$_e$' from the signal receiving unit 120, and the projectile referenced earth's magnetic field vector 'M$_b$' from the magnetometers 130. At 214, the processing unit 140 utilizes the projectile referenced velocity vector 'V$_b$' and the earth referenced earth's magnetic field vector 'M$_e$' along with the earth referenced velocity vector 'V$_e$' and the projectile referenced earth's magnetic field vector 'M$_b$' to determine the attitude of the projectile using the TRIAD method. The determination of attitude of the projectile includes determination of at least one of a roll attitude, a yaw attitude and a pitch attitude of the projectile. Specifically, the processing unit 140 uses the TRIAD method to compute the direction cosine matrix 'T$_{be}$' based on the earth referenced velocity vector 'V$_e$', the projectile referenced velocity vector 'V$_b$', the body referenced earth's magnetic field vector 'M$_b$' and the earth referenced earth's magnetic field vector 'M$_e$' of the projectile to determine the attitude of the projectile in the form of the at least one of the roll, attitude, the yaw attitude and the pitch attitude. The method 200 end at 216.

The present disclosure provides an efficient and cost-effective system, such as the system 100, and method, such as the method 200, for determination of attitude for a projectile in flight. Further, the system 100 and the method 200 determine the attitude of the projectile that is insensitive to roll rate, day/night operation, coning, and maneuvers, while the projectile is in flight. The system 100 and the method 200 also provide high bandwidth measurement of the roll attitude of the projectile in flight, while using slower sample rates on velocity. Based on the aforementioned, the present disclosure assists in determination of attitude for a projectile in flight in order to accurately intercept/hit the target. Specifically, the present disclosure facilitates in an effective determination of the attitude of a projectile between two co-ordinate systems (the projectile body co-ordinates and the inertial space (earth co-ordinates)) with the measurement of two vectors (velocity and magnetic field vectors) in both co-ordinate systems using the well known TRIAD algorithm. More specifically, the present disclosure assists in determining roll attitude, pitch attitude and yaw attitude of the projectile in flight between body co-ordinates of the projectile and the earth co-ordinates.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A system for determination of attitude for a projectile in flight, the system comprising:
   at least one antenna mounted on the projectile, each antenna of the at least one antenna configured to receive global positioning system (GPS) signals from at least four satellites through wireless communication;
   a signal receiving unit communicably coupled to the each antenna of the at least one antenna to receive the GPS signals from the each antenna, the signal receiving unit configured to ascertain an earth referenced velocity vector of the projectile with respect to earth's co-ordinates by utilizing the GPS signals;
   a plurality of magnetometers mounted onto the projectile and configured to ascertain a projectile referenced earth's magnetic field vector with reference to body co-ordinates of the projectile; and
   a processing unit communicably coupled to the signal receiving unit to receive the earth referenced velocity vector of the projectile from the signal receiving unit, and to the plurality of magnetometers to receive the projectile referenced earth's magnetic field vector from the plurality of magnetometers, wherein the processing unit ascertains a projectile referenced velocity vector of the projectile with reference to the body co-ordinates of the projectile along the projectile's axis in a direction of the flight, wherein the processing unit is pre-loaded with a earth referenced earth's magnetic field vector with respect to the earth's co-ordinates or ascertains the earth referenced earth's magnetic field vector based on location of the projectile in earth's coordinates as deduced from the GPS signals, and wherein the processing unit is configured to utilize the projectile referenced velocity vector of the projectile and the earth referenced earth's magnetic field vector along with the earth referenced velocity vector of the projectile and the projectile referenced earth's magnetic field vector to determine the attitude of the projectile using a TRIAD method.

2. The system of claim 1, wherein the projectile has a pre-determined angle of attack, wherein the pre-determined angle of attack ranges from 0 to 8 degrees.

3. The system of claim 1, wherein the signal receiving unit ascertains the earth referenced velocity vector of the projectile by observing a Doppler shift in the received GPS signals, and using latitude, longitude and altitude information of the projectile with respect to one or more satellites of the at least four satellites.

4. The system of claim 1, wherein each magnetometer of the plurality of magnetometers is configured orthogonally with respect to an adjacent magnetometer of the plurality of the magnetometers.

5. The system of claim 4, wherein the each magnetometer of the plurality of magnetometers is configured to have a high bandwidth for allowing a sampling rate greater than or equal to about 100 Hertz on a roll attitude of the projectile.

6. The system of claim 1, wherein the earth's co-ordinates are earth's North-East-Down co-ordinates.

7. The system of claim 1, wherein the earth's co-ordinates are earth's North-East-Down co-ordinates.

8. The system of claim 1, wherein the processing unit utilizes the TRIAD method for computing a direction cosine matrix based on the earth referenced velocity vector of the projectile, the projectile referenced velocity vector of the projectile, the projectile referenced earth's magnetic field vector and the earth referenced earth's magnetic field vector to determine the attitude of the projectile.

9. The system of claim 1, wherein the determination of the attitude comprises determination of at least one of a roll attitude, a yaw attitude, and a pitch attitude.

10. A method for determination of attitude for a projectile in flight using a system comprising at least one antenna, a signal receiving unit, a plurality of magnetometers and a processing unit, the method comprising:

receiving global positioning system (GPS) signals by the at least one antenna;

receiving the GPS signals by the signal receiving unit from the at least one antenna;

ascertaining an earth referenced velocity vector with respect to earth's co-ordinates by utilizing the received GPS signals by the signal receiving unit;

ascertaining a projectile referenced earth's magnetic field vector with reference to body co-ordinates of the projectile by the plurality of magnetometers;

receiving the earth referenced velocity vector by the processing unit from the signal receiving unit, and receiving the projectile referenced earth's magnetic field vector by the processing unit from the plurality of magnetometers;

ascertaining a projectile referenced velocity vector of the projectile with reference to the body co-ordinates of the projectile along the projectile's axis in a direction of the flight by the processing unit; and utilizing the projectile referenced velocity vector of the projectile and an earth referenced earth's magnetic field vector derived from stored data dependent on GPS measured earth position of the projectile along with the earth referenced velocity vector and the projectile referenced earth's magnetic field vector by the processing unit to determine the attitude of the projectile using a TRIAD method, wherein the earth referenced earth's magnetic field vector with respect to the earth's co-ordinates is pre-loaded into the processing unit or ascertained by the processing unit based on location of the projectile in the earth's co-ordinates as deduced from the GPS signals.

11. The method of claim 10, wherein the TRIAD method is utilized to compute a direction cosine matrix based on the earth referenced velocity vector of the projectile, the projectile referenced velocity vector of the projectile, the projectile referenced earth's magnetic field vector and the earth referenced earth's magnetic field vector to determine the attitude of the projectile.

12. The method of claim 11, wherein the determination of attitude comprises determination of at least one of a roll attitude, a yaw attitude, and a pitch attitude.

* * * * *